United States Patent
Ang et al.

(10) Patent No.: US 6,873,844 B2
(45) Date of Patent: Mar. 29, 2005

(54) ADAPTIVE ORTHOGONAL CHANNEL NOISE SOURCE

(75) Inventors: Swee-Seng Ang, Sachse, TX (US);
Frank Jager, Plano, TX (US);
Muhieddin Najib, Richardson, TX (US)

(73) Assignee: Nortel Networks Limited, St. Laurent ( * ) Notice: Subject to any disclaimer, the term of this patent is extended or adjusted under 35 U.S.C. 154(b) by 540 days.

(21) Appl. No.: 10/109,546

(22) Filed: Mar. 28, 2002

(65) Prior Publication Data

US 2004/0203418 A1 Oct. 14, 2004

(51) Int. Cl.⁷ .......................... H04Q 7/20; H04B 17/00
(52) U.S. Cl. ..................... 455/424; 455/423; 455/67.11
(58) Field of Search ................... 455/423, 424, 455/67.11, 67.14, 446, 453

(56) References Cited

U.S. PATENT DOCUMENTS

| | | | |
|---|---|---|---|
| 5,475,870 A | 12/1995 | Weaver et al. | 455/67.11 |
| 5,519,888 A | 5/1996 | Hall et al. | 455/249.1 |
| 6,052,584 A | 4/2000 | Harvey et al. | 455/423 |
| 6,456,652 B1 | 9/2002 | Kim et al. | 375/224 |
| 6,766,164 B1 | 7/2004 | Funk et al. | 455/423 |
| 6,782,246 B1 | 8/2004 | Kretschmer et al. | 455/226.3 |

*Primary Examiner*—Vivian Chin
*Assistant Examiner*—Raymond B. Persino
(74) *Attorney, Agent, or Firm*—Slater & Matsil, L.L.P.

(57) ABSTRACT

A method of adapting the Orthogonal Channel Noise Source (OCNS) for optimization and acceptance testing of a CDMA based wireless network under load conditions is disclosed. According to an embodiment of the invention, a test loading level (for example, 80%) and performance requirements are established for a plurality of Base-station Transceiver Subsystems (BTS). The subsystems then transmit any required overhead power plus sufficient OCNS power such that the total output level of the BTS power amplifier is at the selected test level (e.g. 80%). As a mobile unit moves within range of a BTS and requests access, the unit's power requirement is determined based on the requested data rate. The OCNS power level of the new BTS is then adjusted or lowered by an amount equal to the detected power requirements to allow access to the mobile unit. The BTS then establishes a communication link with the mobile unit. Thus, the total power output of the tower under test is maintained at a pre-selected level such as for example 80%.

17 Claims, 3 Drawing Sheets

ADAPTIVE ORTHOGONAL CHANNEL NOISE SOURCE

FIELD OF THE INVENTION

The present invention relates to optimization and testing the performance of a CDMA based wireless network under loaded conditions, and more specifically to methods of adapting the Orthogonal Channel Noise Source (OCNS) to maintain a desired loading level so as to avoid invalidating test results.

BACKGROUND OF THE INVENTION

As will be appreciated by those skilled in the art, the wireless or mobile telephone is no longer simply used for voice communications. Although voice communications remain a primary purpose for many of these communication devices, these devices are being called on to provide the same communication data exchange services demanded by the hard wired communication systems including the transmission of vast amounts of data such as provided through public and private internet connections. The mobility of the wireless units and the high data transmission rates used with these systems presents challenges to the acceptance testing of a new system or an existing system as it expands into new and previously uncovered territory.

To meet the new demands placed on wireless systems, recent developments have evolved from the original analog cellular or mobile telephones which were almost entirely limited to voice communications. Second-generation digital mobile cellular phones were also previously concerned with voice communications, but instead of using conventional analog transmissions, transmitted voice data in digital packets. Transmission by digital packets, however, readily lends itself to the transmission or exchange of vast amounts of non-voice data as well as voice data. In any event, the demands for transmitting various types of digital data has recently exploded, and the processing or packaging of non-voice digital data for transmission over wireless communication systems has developed rapidly and somewhat separately from the processing and packaging of voice data packets. In a typical communication system, the two types of data are processed separately and then merged and transmitted over both the second-generation (2G) systems and third generation (3G) systems, such as for example, CDMA (Code Division Multiple Access). It should also be noted that CDMA is used in certain 2G cellular networks like Sprint PCS and Verizon.

The rapidly increasing demands for transmitting high volume non-voice data has introduced new problems for providing coverage over new regions or areas. For example, a CDMA 3G system has the capability of transmitting large blocks of non-voice data at significantly higher bit rates depending on the system loading that exists at the time of transmission. Since the higher bit rates require significantly more power to transmit than transmitting lower bit rates, the amount of power required to accept a hand-off or include a single, additional or new mobile into the group of mobiles being serviced by an individual BTS (Base-station Transceiver Subsystems) varies dramatically. Such widely varying power demands between different mobile units makes the task of obtaining valid acceptance test data much more difficult. The method of the present invention discloses a novel method for testing newly installed or upgraded systems which provides meaningful and valuable acceptance test data to the customer.

SUMMARY OF THE INVENTION

Other objects and advantages of the invention will in part be obvious, and will in part appear hereinafter, and will be accomplished by the present invention which provides a method of testing a system under required loading conditions without the risk of invaliding data due to unintended over-loading or under-loading of the system. The steps of the method according to this invention of testing a wireless communication system comprise the steps of selecting a traffic loading level for the power output of each of the BTS locations involved or associated with the system or portion of the system being tested. The selected power output level of each BTS under test will include an Orthogonal Channel Noise Source (OCNS) portion and another portion equal to the power requirements of actual mobile units (whether test units or non-test units) communicating with (i.e. connected to) a BTS. Upon receiving a request for service by another or additional mobile unit, (i.e. a request to be added to the group of units being served by a specific BTS), the power requirements of the requesting or additional mobile unit are determined. The power requirements of the requesting unit typically will be based upon the requested data rates and the signal to noise ratio required to achieve an acceptable link performance. The OCNS portion of the power output of the BTS being tested is then adjusted or reduced by an amount equal to the determined or detected power requirements of the additional mobile unit so that when accepted by the BTS, the total power output will be maintained at the selected traffic loading level. Communication can then be safely established between the BTS and the additional mobile unit. Once the call is terminated or a handoff to another BTS is completed, the OCNS portion of the BTS power output can then be readjusted to continue maintaining the BTS overall power output at the selected level to meet the customer's requirements.

DESCRIPTION OF PREFERRED EMBODIMENTS

Figure 1:
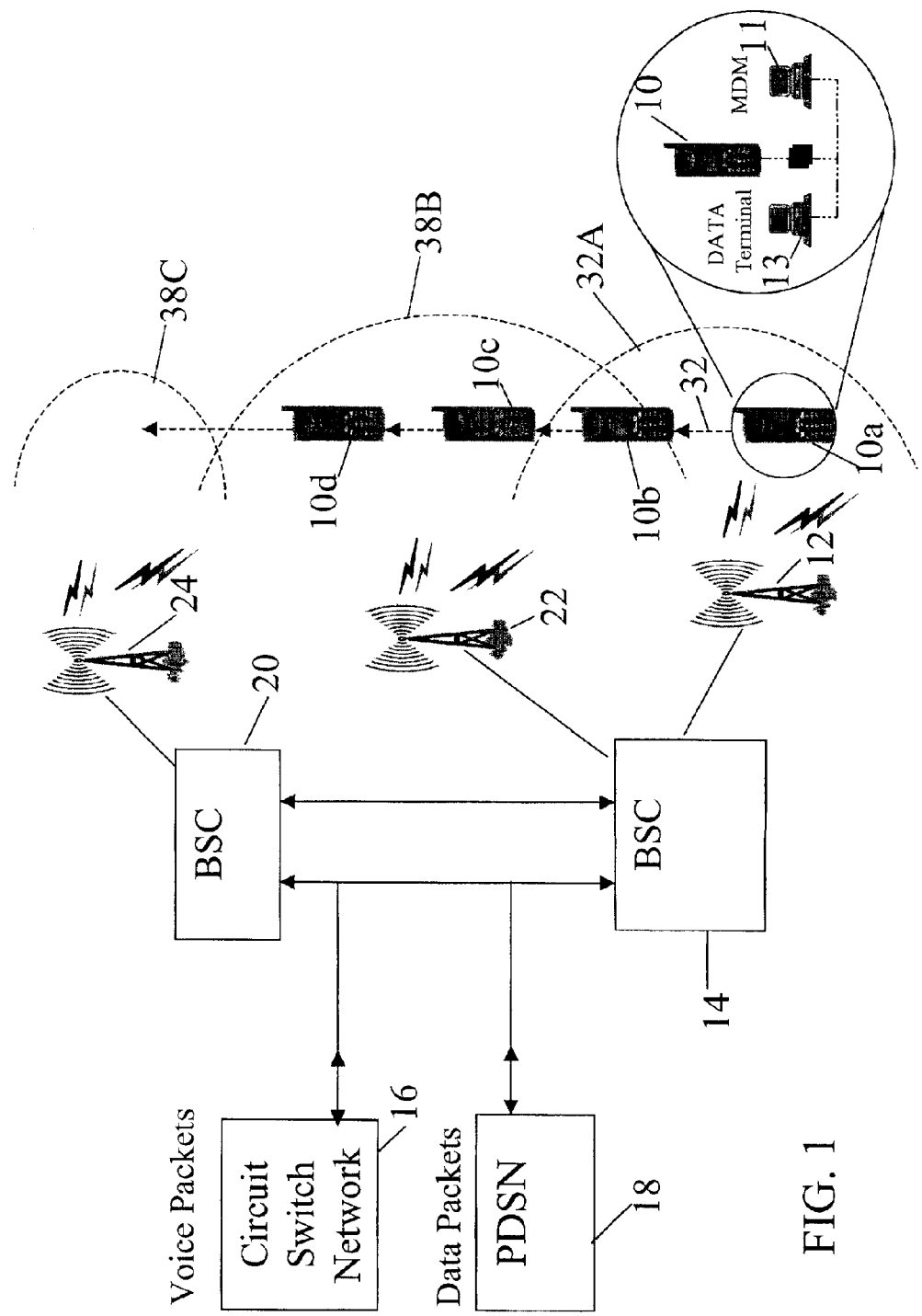
FIG. 1 illustrates a schematic view of a typical 3G CDMA based system suitable for using the test procedures of the present invention.

Referring now to FIG. 1, there is shown a functional schematic diagram of a wireless system that can benefit from the optimization and acceptance testing method of the present invention. It will be appreciated that although certain of the functions indicated in the figure, are separated from other functions, such separation is not intended to suggest that the hardware providing these functions will also be separated.

Although details of the invention will be discussed hereinafter, a generalized discussion of a typical CDMA based wireless communication system functional diagram follows. As shown, a wireless terminal 10 is in communication with a transmission tower or BTS (Base-station Transceiver Subsystems) 12 in a particular region or area. As used herein, the term "wireless terminal" is applicable to wireless/mobile telephones, terminals in the form of combinations of wireless Personal Digital Assistants (PDAs or "Palm Pilots") and mobile telephones, wireless networking cards connected to stationary or mobile equipment, and the like. For example, as shown in the expanded view, wireless terminal 10 may be connected to computer terminal 11 which includes a MDM (Mobile Diagnostic Module) or test software. Alternatively, the wireless terminal 10 may be connected to a data terminal 13.

The transmission tower or BTS 12 is itself in communications with a controller such as a BSC (Base Station Controller) 14 which receives and combines both voice packets from a circuit switch network 16 and data packets provided from a Packet Data Service Network (PDSN) 18 available from Nortel Networks. The PDSN 18 is typically in communication with various sources of data such as the public internet or private data sources. It is noted that the PDSN 18 may also be in communication with other PDSN units (not shown), and of course, circuit switch network 16 will be in communication with other voice based networks (not shown).

Further, although FIG. 1 only indicates that PDSN 18 is in contact with BSC unit 14 and a second BSC unit 20, it will be appreciated that PDSN 18 and the voice based circuit switch network 16 may actually be in contact with a large number of BSC units.

Also as shown, FIG. 1 includes second and third BTS transmission towers 22 and 24 for purposes of illustrating how wireless terminal 10 may be in the form of a mobile terminal such as a mobile telephone or unit 10 capable of movement along a selected path. For example, as shown in FIG. 1, unit 10 is moving along path 32 from the first location (indicated at 10a) where it is in radio communication only with BTS transmitting tower 12 to a second location as indicated at 10b where it is in communication with both BTS tower 12 and second BTS transmission tower 22 at a different location, which will allow a "soft handoff" which will be transparent to the user. Then as indicated in FIG. 1, further movement of the unit along path 32 will result in completion of the soft handoff after which the mobile unit will lose its communication link with BTS 12 while maintaining a link with BTS 22 as shown at locations 10c and 10d. Likewise, a third tower 24 could be in communication with BSC 14, or alternatively and as shown in FIG. 1, BTS tower 24 could be in communication with a second controller BSC 20 such that further movement along path 32 results in a mobile unit 10 losing communication with tower 22 after a handoff to tower 24.

As can be seen from FIG. 1, the wireless mobile unit Radio Frequency (RF) coverage of the BTS transmission tower 12 represented by the circle 38A overlaps the (RF) coverage of BTS 30 represented by circle 38B. As will be appreciated by those skilled in the art, such overlap is necessary if mobile unit 10 is to move along path 32 and maintain an uninterrupted communication link to the system. However, the "perfect circle" of coverage by BTS 12 and BTS 22 and the overlap may not represent the actual situation. For example, see the area of coverage of tower 24 as represented by circle 38c. Large structures, the terrain (mountains and valleys) may result in very irregular (i.e. non-circular) coverage by any particular BTS or transmission tower. In addition, such large structures and the terrain may also prevent the ideal placement of BTS transmission towers to obtain desired coverage. Finally, of course, even if the ideal location for placing a BTS transmission tower is not obstructed by physical structures or geography, landowners often refuse to allow the placement of these transmission towers on their property. Consequently, perfect and complete coverage of an area by carefully placing the towers simply does not normally occur.

It will also be appreciated that unlike wired or even stationary wireless telephone systems, the amount of communication traffic by mobile wireless units occurring in a selected area required to be supported by a particular tower may vary enormously. For example, even though the average amount of present and future communication traffic expected to occur may be predicted or determined over a period of time with some reasonable accuracy, the demands on a particular BTS or transmission tower over any snapshot period of time is absolutely unpredictable. Consequently, if a demand overload situation occurs, many calls or communication links would be denied access. Otherwise, existing calls may break up or completely drop out and lose their link.

Typically, a system will be designed such that the power output of each BTS or transmission tower will operate effectively (i.e. without an unacceptable level of drop-outs or frame losses) by limited access to the system if the power loading will exceed a pre-selected value, such as for example, about 80% of the power amplifier output of the tower. As was discussed above, however, the demands on a particular BTS or transmission tower for an established system with a long-time history are unpredictable for any short period of time. Thus, by limiting access to additional mobile units when the power loading exceeds the pre-selected level (e.g. 80%) there is a reserve of power (e.g. 20%) to handle short term or temporary excess power demands without unacceptable drop out rates for the connected customers.

Such unpredictability of demands on a transmission tower significantly complicates the testing and acceptance of a new system or the addition of coverage in a new previously uncovered area of an established system. Thus, companies offering service are never certain whether or not a new system will meet the agreed to performance requirements until the system has been operational over a substantial period of time. The present invention discloses a method for providing dependable and accurate test results that can give a customer confidence that the system will operate at the power level indicated by the acceptance test results.

Figure 2:
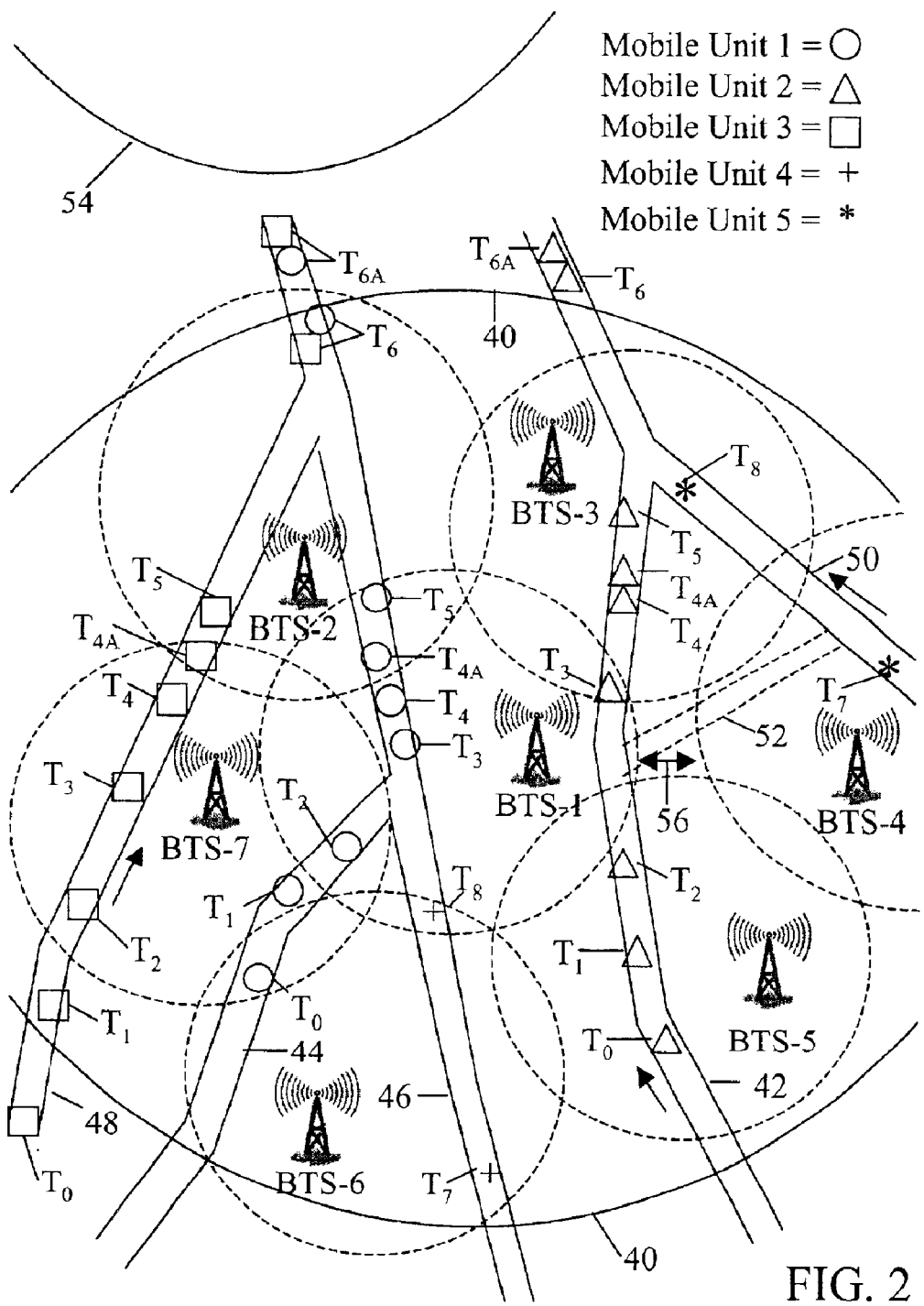
FIG. 2 illustrates the typical overlapping coverage of a group of BTS (towers) of the system of FIG. 1, and the various possible communication links that may exist between mobile units traveling along varying paths (such as a road) and BTS towers in communication range.

Referring now to FIG. 2, there is shown a geographical area where new wireless coverage is to be installed. As shown, the area includes seven BTS transmission towers, BTS 1–7, for providing coverage substantially over the area indicated by the large circle 40. The area also includes several major roadways such as roadways or paths 42, 44, 46, 48 and 50. In addition to the major roadways, it will be appreciated that a large number of smaller streets, residential areas and the like are included in the large area 40. These secondary streets and roadways such as road 52 to be described later are accessible from the major roadways. Thus, a wireless mobile unit may reasonably expect to establish a communication link substantially anywhere in the area 40. For purposes of explanation, the seven transmitting towers or BTS units are shown with circular transmission patterns and are located in a fairly regular location pattern. Although the coverage area 40 is reasonably complete, as will be discussed, there are still some non-covered or dead areas well into the interior of area 40 as well as the fringes or perimeters of area 40. Again, for purposes of explanation only, all of the mobile units discussed will be associated with roadway traffic (since maintaining a link with fast moving mobile units is more difficult to deal with) and assumed to be heading in one direction toward a destination area 54. It will be appreciated, of course, that in actual operation or testing, traffic will likely be headed in both directions on any or all of the roadways, and the mobile units may be carried completely off road.

In any event, it is seen that traffic entering into area 40 on roadway or path 42 and moving toward destination 54 will encounter cells or areas covered by BTS units or transmission towers such as BTS-5, BTS-1 and BTS-3. Traffic entering area 40 on path 44 headed toward destination 54 will encounter transmission towers BTS-6, BTS-7, BTS-1 and BTS-2. Likewise, the transmission towers encountered by moving traffic along roadways or paths 46, 48 and 50 can also be determined by reference to FIG. 2. As was mentioned above, the placement of transmission towers or unusual transmission patterns from a particular tower may result in dead zones in a region that otherwise is well covered. For example, as shown in FIG. 2, there is a dead zone 56 completely surrounded by the transmission patterns for transmission towers BTS-1, BTS-3, BTS-4 and BTS-5.

Referring again to FIG. 2 and assuming mobile test units are traveling along roadway or paths 42 and 44 toward destination 54 before a mobile test unit enters the boundary of transmission tower BTS-1, the loading of BTS-1 will be $L_0$ or the initial loading. In actual usage, the number of mobile units initiating and terminating calls may be significantly greater than one or two. However, for purposes of the following explanation, the term $L_0$ as initial loading will assume there are no other wireless units moving in the transmission pattern area of a tower. It is also assumed that any existing communication links already established will continue (that is, the link will not terminate during the testing process). Likewise, there will be no other connection links established during the test other than those discussed.

Thus, it is seen that BTS-1, BTS-2, BTS-3 and BTS-4 are all at $L_0$ at $T_0$ since there are no mobile units within the transmission pattern of these towers. However, BTS-6 and BTS-7 are at power loading level $L_1$ since at $T_0$, a mobile unit #1 on path 44 is within the transmission pattern area of these two towers. Likewise, BTS-5 is also at $L_1$ power loading level since a mobile unit #2 on path 42 at time $T_0$ is within its transmission pattern area. Table 1 illustrates the power loading of each transmission tower or BTS at times $T_0$ through $T_8$.

TABLE 1

| TIME | BTS-1 | BTS-2 | BTS-3 | BTS-4 | BTS-5 | BTS-6 | BTS-7 |
|---|---|---|---|---|---|---|---|
| $T_0$ | $L_0$ | $L_0$ | $L_0$ | $L_0$ | $L_1$ | $L_1$ | $L_1$ |
| $T_1$ | $L_0$ | $L_0$ | $L_0$ | $L_0$ | $L_1$ | $L_0$ | $L_1$ |
| $T_2$ | $L_1$ | $L_0$ | $L_0$ | $L_0$ | $L_1$ | $L_0$ | $L_2$ |
| $T_3$ | $L_2$ | $L_0$ | $L_1$ | $L_0$ | $L_0$ | $L_0$ | $L_1$ |
| $T_4$ | $L_1$ | $L_0$ | $L_1$ | $L_0$ | $L_0$ | $L_0$ | $L_1$ |
| $T_{4A}$ | $L_1$ | $L_2$ | $L_1$ | $L_0$ | $L_0$ | $L_0$ | $L_1$ |
| $T_5$ | $L_1$ | $L_2$ | $L_1$ | $L_0$ | $L_0$ | $L_0$ | $L_0$ |
| $T_6$ | $L_0$ | $L_2$ | $L_0$ | $L_0$ | $L_0$ | $L_0$ | $L_0$ |
| $T_{6A}$ | $L_0$ | $L_0$ | $L_0$ | $L_0$ | $L_0$ | $L_0$ | $L_0$ |
| $T_7$ | $L_0$ | $L_0$ | $L_0$ | $L_1$ | $L_0$ | $L_1$ | $L_0$ |
| $T_8$ | $L_1$ | $L_0$ | $L_1$ | $L_0$ | $L_0$ | $L_0$ | $L_0$ |

At time $T_1$, the mobile unit #1 on path 44 has moved out of range of transmission tower BTS-6, but is still in the pattern area of BTS-7 and is just outside the range of BTS-1. The mobile unit #2 on path 42 has also moved toward transmission tower BTS-1, but is still well within the pattern area of BTS-5 and has not entered or left the transmission pattern areas of any other towers. Therefore, at time $T_1$, BTS-1, BTS-2, BTS-3, BTS-4 and BTS-6 are all at power loading $L_0$, and BTS-7 and BTS-5 are at power loading level $L_1$ as shown in Table 1. It is also noted that a mobile unit #3 on path 48 is just out of range of BTS-7.

At time $T_2$, unit #1 on path 44 is still in range of BTS-7 and is also now in range of BTS-1. Also, unit #3 on path 48 has moved into range of BTS-7 and mobile unit #2 on path 42 is just out of range of BTS-1. Thus, the power loading of all of the towers is now as shown at $T_2$ in Table 1.

At time $T_3$, the mobile unit #1 on path 44/46 (i.e. path 44 and path 46 have merged) is still well within transmission pattern of BTS-1, but has left the range of transmission tower BTS-7. The mobile unit #2 on path 42 has entered the range of BTS-3 and is about to leave the transmission pattern of BTS-1 and mobile unit #3 on path 48 is still well within the transmission pattern of BTS-7. Thus, power loading levels are as shown at time $T_3$ in Table 1.

The power loading levels of each transmission tower for the remaining time periods $T_4$, $T_{4a}$, $T_5$, $T_6$, $T_{6A}$, $T_7$ and $T_8$ also shown in Table 1 are determined from FIG. 2. It should also be noted that time $T_4$ represents the time just before mobile unit #3 on path 48 and mobile unit #1 on path 44/46 enter the transmission pattern of transmission tower BTS-2, and the time $T_{4A}$ is just after the mobile units #1 and #3 enter the range of BTS-2. For purposes of discussion, it is assumed mobile units #1 and #3 on path 48 and path 44/46 enter the range of transmission tower BTS-2 at substantially the same time and exit the pattern of BTS-2 at substantially the same time. Thus, time $T_6$ represents the location of mobile units #1 and #3 just before they leave the range of BTS-2 and time $T_{6A}$ represents the location just after they leave the range of BTS-2. Times $T_7$ and $T_8$ show the power loading of two additional mobile units #4 and #5 as they move on roadway 46 and roadway 50.

It should also be noted that the transmission patterns of all of the BTS towers are illustrated as having a bright line boundary. Of course, the actual boundary areas of the transmissions are not at all so distinct and may even vary depending upon atmospheric conditions, etc.

As mentioned above, system towers or BTS units are designed to operate at selected performance levels (e.g. an acceptable number of lost bits, drop-outs, etc.) at specific loading levels. For example, a system may be designed to operate without any reduced performance when at the pre-selected loading or less. A customer or service operator will not want to accept or sign off on a system until it can be shown with some degree of certainty that the system can meet these performance levels. To date, there simply has been no suitable testing method for offering that degree of certainty.

Therefore, according to the present invention, the communication coverage and performance of a system such as illustrated in FIG. 2 may be tested by setting the total transmission power of each BTS unit to a pre-selected level such as for example 80% of the power amplifier output of the BTS transmission tower. It should be appreciated that although 80% loading is discussed as the pre-selected loading level and does represent a typical selected value, other values may be selected depending on the requirements of the customer or system.

This total power output of a transmission tower or BTS unit during testing of a system will typically be comprised of a large portion of OCNS (Orthogonal Channel Noise Source) power and a smaller portion representative of the overhead power. Further, as mentioned above, the total output power level made up of these two portions will be set, for example, at a pre-selected amount (e.g. 80%) of the possible power available from the tower power amplifier. Since a CDMA based network typically operates at a given or selected loading level, described as a percentage of the total power amplifier (PA) power, the loading level defines a system capacity and influences system performance in terms of dropped calls and call access failures. In other words, the system performance is clearly tied to the loading levels and service operators generally want the testing of their networks to take place under loaded conditions. Therefore, vendors of such CDMA based systems are required to demonstrate the performance of the CDMA based networks under loaded conditions. However, for a new system, there will not be the necessary number of users in the network to constitute the desired loading level. Therefore, loading is provided by means of OCNS as one or more test mobiles are used to collect performance data for further processing. These test mobiles add noise to the system and the level of noise is proportional to the data rate at which they transmit. The test mobiles are typically loaded onto a vehicle and moved across the network so as to cover several BTS in one run. As the vehicle moves from one sector to another, the total noise generated from the system to serve the test mobiles plus the OCNS noise and overhead could exceed or be less than the desired loading level. Thus, according to this invention to maintain the total power output of the subsystem at a selected level, such as for example, 80%, the OCNS portion of the power loading is automatically updated or adjusted, such that the total loading of the subsystem from the OCNS plus the existing communication links with the mobile units (test units or actual units) is maintained at the desired value.

The reason for setting the total output power at a high level such as 80% is because CDMA based systems are substantially "interference limited" which means that the interference generated by all of the towers or base stations and other mobile users in the area of a particular or serving base station is much greater than the ever-existing thermal noise. Consequently, most of the power allocated to a user of a CDMA based system to provide a desired performance level is to mitigate interference rather than thermal noise. Therefore, if a performance or acceptance test is to be meaningful and accurate, it is necessary to maintain the noise in the network so that the total power loading of the system is at the pre-selected operation level (such as for example the typical 80% power output level).

Thus, as mentioned above, it is assumed that there are no other mobile units operating in the region to be tested as indicated by the large circle 40 shown in FIG. 2 except the "moving" units discussed. Therefore, during the acceptance testing, a pre-selected power loading level $L_0$ (e.g. 80%) is comprised of the necessary overhead power of the system plus the necessary OCNS power to make up the pre-selected level. A power loading level of 80% for $L_1$ represents the portion of power used by a single mobile unit plus the necessary portion of OCNS and overhead power to make up 80%, and $L_2$ represents the portion of power used by two mobile units plus the necessary OCNS and overhead power to reach 80%.

Figure 3:
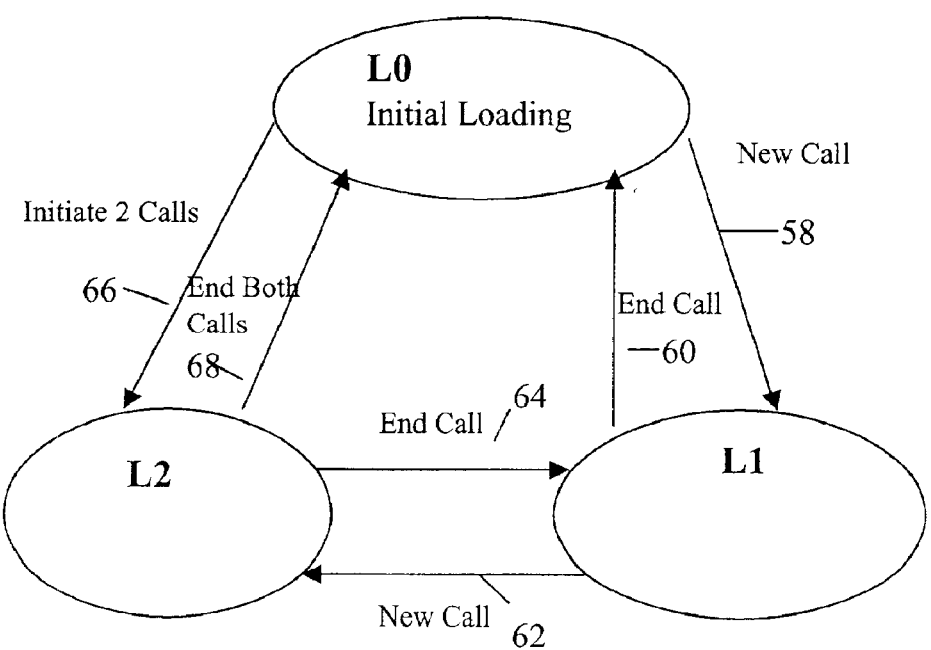
FIG. 3 is a graphic illustration of the loading and unloading of BTS towers as two test mobile units move along different roadways of FIG. 2.

FIG. 3 illustrates the possible loading cycles between an initial $L_0$ loading and an $L_1$ loading of any BTS tower for a single mobile unit and an $L_2$ loading for two mobile units. As shown, if a new call is initiated as indicated at 58, the loading changes from $L_0$ to $L_1$. While at the $L_1$ loading level, the call can be terminated or ended as indicated at 60 such that the level of loading returns to $L_0$. Alternatively, another mobile unit can initiate a call so as to change the loading level to $L_2$ as indicated at 62. Termination of the second call as indicated at 64 returns the loading to the $L_1$ level. Another possible sequence is indicated at 66 where two calls are initiated at substantially the same time. Both calls can then be simultaneously terminated as indicated at 68 which changes the loading level to $L_0$ or only one call can be terminated as indicated at 64 changing the loading level $L_2$ to $L_1$.

Figure 4:
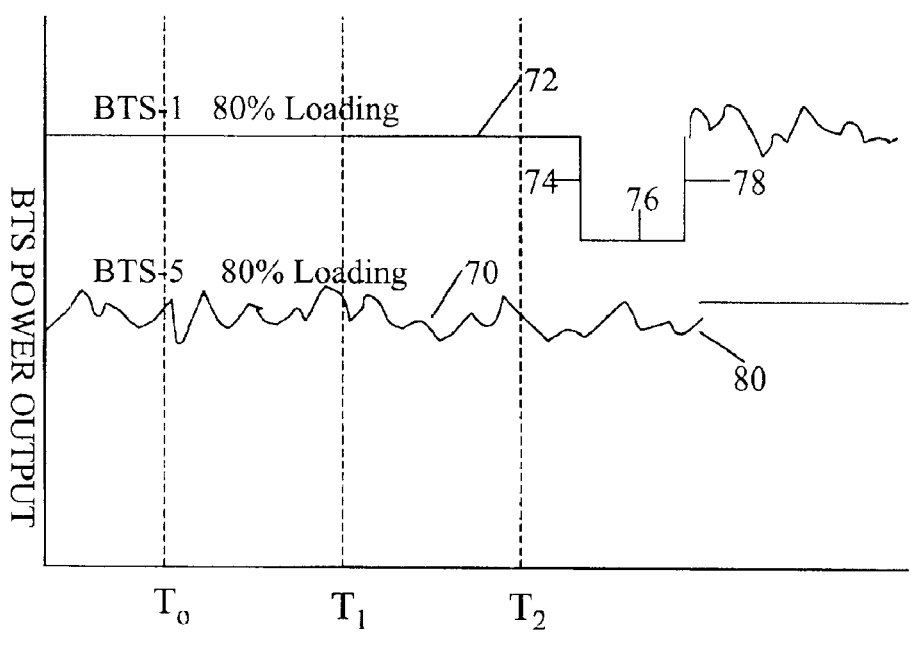
FIG. 4 is a graph showing a transfer or hand-off between two transmission towers (BTS) of a mobile test unit moving along a roadway or path.

Referring again to FIG. 2 and also to FIG. 4, there is illustrated how the adaptive OCNS process operates in a mobile unit moving along roadway or path 42 of FIG. 2. As shown, at time $T_0$ and $T_1$, the BTS-5 transmission tower is in communication with the mobile units as indicated at graph line 70 of FIG. 4. As shown, the power requirements of the mobile unit fluctuates around a selected power level of about 80% depending upon the demands and parameters of the mobile unit such as for example data rates. It is noted that the power level of BTS-1 on graph 72 during the $T_0$ and $T_1$ time period is constant as there are no mobile units being serviced and the power emitted by BTS-1 is all OCNS power plus overhead. Then, at some time shortly before time T2, the mobile unit will request to also be added as a unit serviced by transmission tower BTS-1. At this point, the power request of the mobile unit at the current data rate can be determined by call flow data associated with BTS-5 which already has a communication link established with the mobile unit. The OCNS power output from BTS-1 will then be lowered by the power requirements as determined from BTS-5 to allow the mobile unit to be added. This is illustrated at 74 on curve 72 of FIG. 4. Then, as indicated at 76, BSC-1 will allocate access to the mobile unit which after appropriate handshaking will establish a communication link as indicated at 78 on curve 72 of FIG. 4. Both the BTS-1 and BTS-5 towers will serve the mobile unit until the unit leaves the range of BTS-5 as indicated at 80 on curve 70 of FIG. 4. It is noted that the power level of BTS-5 is shown to be constant after the mobile unit leaves the range as the level of OCNS power is increased to maintain the output at the test level, such as for example, 80%.

Thus, there has to this point been described the unique methods of this invention for testing a new CDMA based communication system while maintaining a substantially constant loading level. However, although the present application has been described with respect to specific methods, it is not intended that such specific references be considered limitations upon the scope of the invention except as is set forth in the following claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed:

1. A method of testing a wireless communication system comprising the steps of:

selecting a test loading level for a BTS ("Base-station Transceiver Subsystem") power output, said selected loading level including an OCNS (Orthogonal Channel Noise Source) portion and a portion representing the power requirements of connected mobile units;

determining the power requirements of a selected mobile unit;

adjusting said OCNS portion of said BTS power output by an amount equal to said determined power requirements of said selected mobile unit; and establishing a communication link between said BTS and said selected mobile unit such that said selected test loading level is maintained.

2. The method of claim 1 further comprising the steps of:

determining the power requirements of another selected mobile unit;

further adjusting said OCNS portion of said BTS power output by an amount equal to said determined power requirements of said another selected mobile unit; and establishing communications between said BTS and said another selected mobile unit such that said selected test loading level is maintained.

3. The method of claim 2 further comprising the steps of terminating said communications between said BTS and said selected mobile unit; and readjusting said OCNS portion of said BTS power output such that said selected test level loading is maintained.

4. The method of claim 2 wherein said wireless communication system is a CDMA based system.

5. The method of claim 2 wherein said selecting step comprises selecting a range of test loading levels and further comprising repeating said determining, adjusting and establishing steps for each of said test loading levels.

6. The method of claim 1 further comprising the steps of:

terminating said communications between said BTS and said selected mobile unit; and readjusting said OCNS portion of said BTS power output such that said selected test level loading is maintained.

7. The method of claim 1 wherein said power requirements of said selected mobile unit varies with the transmission data rate of said unit.

8. The method of claim 1 wherein said selected mobile unit is in communication with another BTS and said step of determining comprises the steps of measuring the power requirements of said selected mobile unit as a function of the required signal to noise ratio and the requested data rate between another BTS and said first selected mobile unit.

9. The method of claim 1 wherein said wireless communication system is a CDMA based system.

10. The method of claim 1 wherein said selecting step comprises selecting a range of test loading levels and further comprising repeating said determining, adjusting and establishing steps for each of said test loading levels.

11. The method of claim 1 further comprising the step of receiving a request for service from said selected mobile unit prior to said adjusting step.

12. A method of testing a wireless communication system comprising a multiplicity of BTS units spaced over an area and each BTS unit providing a pattern of coverage, said method comprising the steps of:

selecting a test loading level for the power output of each one of said multiplicity of BTS units, said selected loading level of each BTS unit including an OCNS (Orthogonal Channel Noise Source) portion and a portion representing the power requirements of connected mobile units;

establishing a communication link between a first one of said multiplicity of BTS units and a selected mobile unit located within the pattern of coverage of said first one of said multiplicity;

transmitting data between said selected mobile unit and said first one of said multiplicity;

moving said selected mobile unit into the pattern of coverage of a second one of said multiplicity of BTS units;

determining the power requirements of said selected mobile unit;

adjusting said OCNS portion of said power output of said second one of said multiplicity of BTS units by an amount equal to said determined power requirements of said selected mobile unit; and establishing a communication link between said selected mobile unit and said second one of said multiplicity of said BTS unit and said second one of said multiplicity of said BTS units such that said selected test loading level is maintained.

13. The method of claim 12 further comprising the steps of:

determining the power requirements of another selected mobile unit;

further adjusting said OCNS portion of said power output of said second one of said multiplicity of BTS units by an amount equal to said determined power requirements of said second selected mobile unit; and establishing a communication link between said second one of said BTS units and said another selected mobile unit such that said selected test loading level is maintained.

14. The method of claim 12 further comprising the step of said second one of said multiplicity of BTS units receiving a request for service from said selected mobile unit prior to said adjusting step.

15. The method of claim 12 further comprising the steps of:

terminating said communication link between said selected mobile unit and said first one of said multiplicity of BTS units; and readjusting said OCNS portion of power output of said first one of multiplicity of BTS units such that said selected test loading is maintained.

16. The method of claim 12 wherein said communication system is a CDMA based system.

17. A method of testing a wireless communication system comprising the steps of:

selecting a test loading level for power output of a BTS unit, said selected loading level including an OCNS portion and a portion representing the power requirements of connected mobile units;

determining the power requirements of a plurality of mobile units;

adjusting said OCNS portion of power output of said BTS unit by an amount equal to said determined power requirements of one of said plurality of mobile units;

establishing a communication link between said BTS unit and said one of said plurality of mobile units; and repeating said adjusting step and said repeating step for other ones of said plurality of mobile units.

* * * * *